US012620104B2

(12) United States Patent
Kohata

(10) Patent No.: US 12,620,104 B2
(45) Date of Patent: May 5, 2026

(54) INFORMATION PROCESSING PROGRAM, INFORMATION PROCESSING METHOD, AND INFORMATION PROCESSING DEVICE

(71) Applicant: Fujitsu Limited, Kawasaki (JP)

(72) Inventor: Shun Kohata, Setagaya (JP)

(73) Assignee: Fujitsu Limited, Kawasaki (JP)

( * ) Notice: Subject to any disclaimer, the term of this patent is extended or adjusted under 35 U.S.C. 154(b) by 369 days.

(21) Appl. No.: 18/452,200

(22) Filed: Aug. 18, 2023

(65) Prior Publication Data

US 2024/0202934 A1      Jun. 20, 2024

(30) Foreign Application Priority Data

Dec. 14, 2022    (JP) .................................. 2022-199604

(51) Int. Cl.
G06T 7/20          (2017.01)
G06V 10/25        (2022.01)
G06V 40/20        (2022.01)

(52) U.S. Cl.
CPC ................ *G06T 7/20* (2013.01); *G06V 10/25* (2022.01); *G06V 40/20* (2022.01); *G06T 2207/30196* (2013.01); *G06V 2201/07* (2022.01)

(58) Field of Classification Search
None
See application file for complete search history.

(56) References Cited

U.S. PATENT DOCUMENTS

| | | | | |
|---|---|---|---|---|
| 12,437,538 | B1 * | 10/2025 | Fayling | ................... H04N 7/181 |
| 2012/0029691 | A1 * | 2/2012 | Mockus | ................... G07F 9/023 |
| | | | | 700/231 |
| 2019/0043003 | A1 * | 2/2019 | Fisher | ................... G06V 10/764 |
| 2019/0138162 | A1 * | 5/2019 | Zverina | ................... G06N 20/00 |
| 2019/0333124 | A1 | 10/2019 | Koo | |
| 2021/0201263 | A1 | 7/2021 | Glaser et al. | |
| 2022/0366426 | A1 * | 11/2022 | Tang | ................... G06Q 30/015 |
| 2024/0354555 | A1 * | 10/2024 | Knipfing | ................... G06N 3/0455 |

FOREIGN PATENT DOCUMENTS

| | | |
|---|---|---|
| CN | 111242714 | 6/2020 |
| JP | 2022-165483 | 11/2022 |

OTHER PUBLICATIONS

EESR—Extended European Search Report mailed on Nov. 28, 2023 for European Patent Application No. 23192652.8.

* cited by examiner

*Primary Examiner* — Michelle M Entezari Hausmann
(74) *Attorney, Agent, or Firm* — Fujitsu Intellectual Property Center

(57)          ABSTRACT

A non-transitory computer-readable recording medium has stored therein an information processing program that causes a computer to execute a process including acquiring a video analyzing the acquired video identifying, based on a result of the analyzing, a first area containing a first object included in the acquired video, a second area containing a second object included in the acquired video, and a relationship that identifies interaction between the first object and the second object based on the specified relationship, selecting a model that is relevant to any one of the first object and the second object from a plurality of models and outputting the selected model.

18 Claims, 14 Drawing Sheets

$\zeta$143

| MODEL IDENTIFICATION INFORMATION | RELATIONSHIP | MACHINE LEARNING MODEL |
|---|---|---|
| M30a | LOOKING AT | DATA OF MACHINE LEARNING MODEL 30a CORRESPONDING TO MODEL IDENTIFICATION INFORMATION "M30a" |
| M30b | TOUCHING | DATA OF MACHINE LEARNING MODEL 30b CORRESPONDING TO MODEL IDENTIFICATION INFORMATION "M30b" |
| M30c | GRASPING | DATA OF MACHINE LEARNING MODEL 30c CORRESPONDING TO MODEL IDENTIFICATION INFORMATION "M30c" |
| ... | ... | ... |

FIG.3

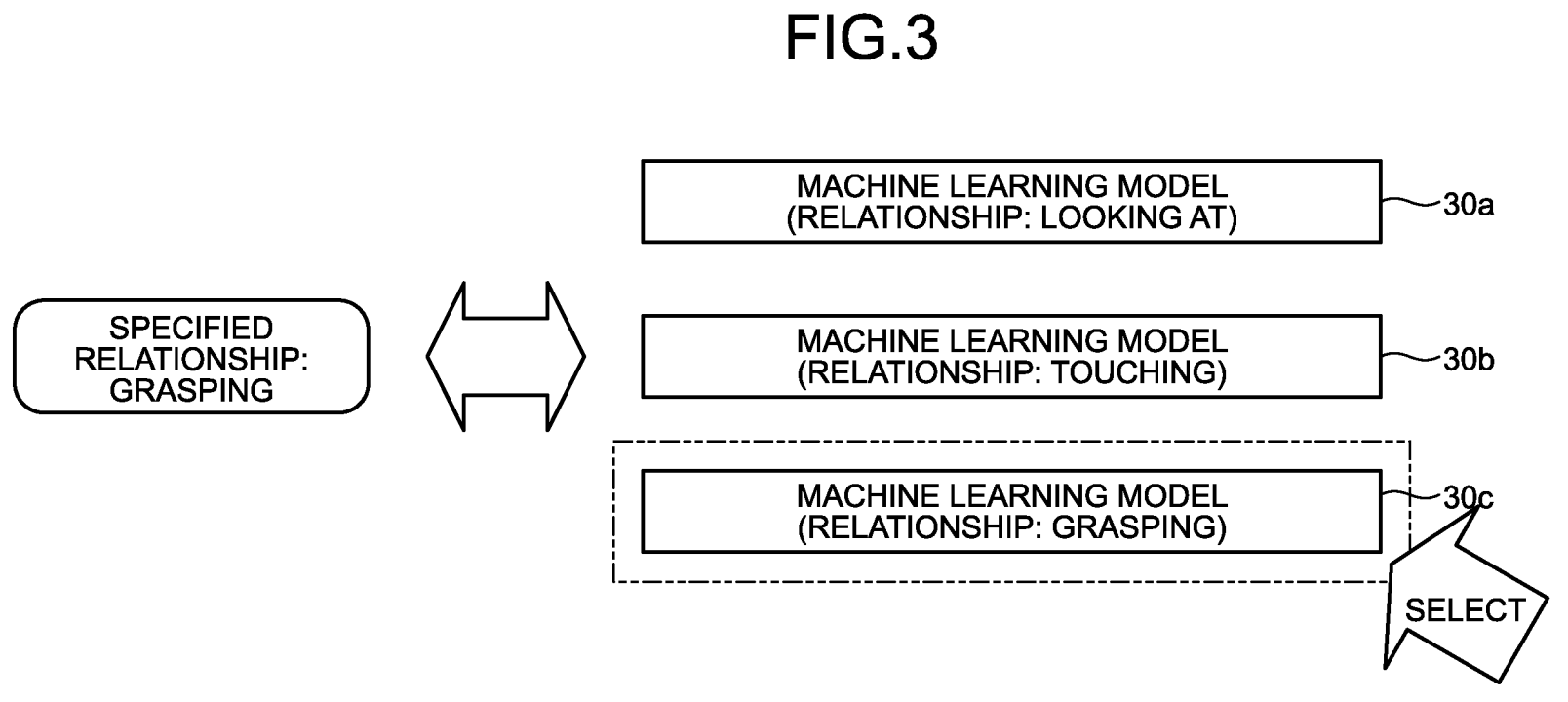

MACHINE LEARNING MODEL (RELATIONSHIP: LOOKING AT) — 30a

MACHINE LEARNING MODEL (RELATIONSHIP: TOUCHING) — 30b

MACHINE LEARNING MODEL (RELATIONSHIP: GRASPING) — 30c

SELECT

SPECIFIED RELATIONSHIP: GRASPING

| MODEL IDENTIFICATION INFORMATION | RELATIONSHIP | MACHINE LEARNING MODEL |
|---|---|---|
| M30a | LOOKING AT | DATA OF MACHINE LEARNING MODEL 30a CORRESPONDING TO MODEL IDENTIFICATION INFORMATION "M30a" |
| M30b | TOUCHING | DATA OF MACHINE LEARNING MODEL 30b CORRESPONDING TO MODEL IDENTIFICATION INFORMATION "M30b" |
| M30c | GRASPING | DATA OF MACHINE LEARNING MODEL 30c CORRESPONDING TO MODEL IDENTIFICATION INFORMATION "M30c" |
| ... | ... | ... |

| DISPLAY DEVICE IDENTIFICATION INFORMATION | POSITION | CAMERA IDENTIFICATION INFORMATION |
|---|---|---|
| A15a | $(x_1, y_1)$ | C10a |
| A15b | $(x_2, y_2)$ | C10b |
| A15c | $(x_3, y_3)$ | C10c |
| ... | ... | ... |

| MODEL IDENTIFICATION INFORMATION | RELATIONSHIP | SERVING-CUSTOMER MODEL |
|---|---|---|
| M40a | LOOKING AT | DATA OF SERVING-CUSTOMER MODEL 40a CORRESPONDING TO MODEL IDENTIFICATION INFORMATION "M40a" |
| M40b | TOUCHING | DATA OF SERVING-CUSTOMER MODEL 40b CORRESPONDING TO MODEL IDENTIFICATION INFORMATION "M40b" |
| M40c | GRASPING | DATA OF SERVING-CUSTOMER MODEL 40c CORRESPONDING TO MODEL IDENTIFICATION INFORMATION "M40c" |
| ... | ... | ... |

FIG.14

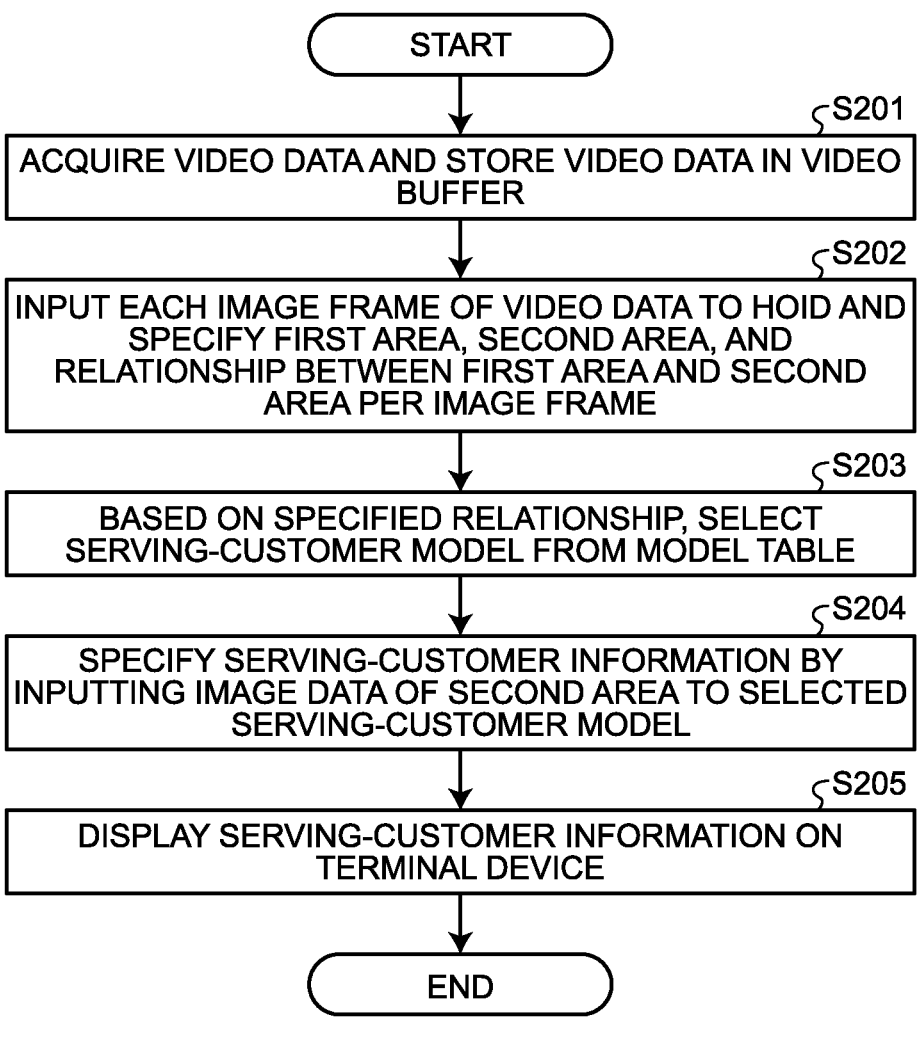

START

S201

ACQUIRE VIDEO DATA AND STORE VIDEO DATA IN VIDEO BUFFER

S202

INPUT EACH IMAGE FRAME OF VIDEO DATA TO HOID AND SPECIFY FIRST AREA, SECOND AREA, AND RELATIONSHIP BETWEEN FIRST AREA AND SECOND AREA PER IMAGE FRAME

S203

BASED ON SPECIFIED RELATIONSHIP, SELECT SERVING-CUSTOMER MODEL FROM MODEL TABLE

S204

SPECIFY SERVING-CUSTOMER INFORMATION BY INPUTTING IMAGE DATA OF SECOND AREA TO SELECTED SERVING-CUSTOMER MODEL

S205

DISPLAY SERVING-CUSTOMER INFORMATION ON TERMINAL DEVICE

END

INFORMATION PROCESSING PROGRAM, INFORMATION PROCESSING METHOD, AND INFORMATION PROCESSING DEVICE

CROSS-REFERENCE TO RELATED APPLICATION (S)

This application is based upon and claims the benefit of priority of the prior Japanese Patent Application No. 2022-199604, filed on Dec. 14, 2022, the entire contents of which are incorporated herein by reference.

FIELD

The embodiments discussed herein are related to an information processing program, etc.

BACKGROUND

Distributors take various measures in order to sell much more products. For example, information on products that are set previously is displayed on an accounting machines, or the like, and sales staffs serve customers. If a sales staff is able to serve a customer appropriately when the customer represents an interest in a product, it is possible to increase the customer's motivation to purchase the product.

For example, related arts are disclosed in Patent Literature 1: Japanese Laid-open Patent Publication No. 2022-165483

SUMMARY

According to an aspect of an embodiment, a non-transitory computer-readable recording medium has stored therein an information processing program that causes a computer to execute a process including acquiring a video analyzing the acquired video identifying, based on a result of the analyzing, a first area containing a first object included in the acquired video, a second area containing a second object included in the acquired video, and a relationship that identifies interaction between the first object and the second object based on the specified relationship, selecting a model that is relevant to any one of the first object and the second object from a plurality of models and outputting the selected model.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

BRIEF DESCRIPTION OF DRAWINGS

FIG. 3 is Diagram (2) for describing the process performed by an information processing device according to the first embodiment;

FIG. 6 is a diagram illustrating an example of a data structure of a model table according to the first embodiment;

FIG. 7 is a diagram illustrating an example of a data structure of a display device management table according to the first embodiment;

FIG. 13 is a diagram illustrating an example of a data structure of a model table according to the second embodiment;

FIG. 14 is a flowchart illustrating a procedure of the process performed by the information processing device according to the second embodiment.

DESCRIPTION OF EMBODIMENT (S)

Only simply displaying information on a product as described above often does not make it possible to increase the customer's motivation to purchase the product. Sales staffs serve customers based on know-how and advices of other sales staffs; however, because it depends largely on the skills of the sales staffs, each sales staff does not appropriately serve a customer currently.

For this reason, it is needed to provide information, or the like, that assist sales staffs in serving according to the relationship between the customer and the product.

For example, it is preferable that information corresponding to a relationship between a first object corresponding to a customer and a second object corresponding to a product be presented to a sales staff and the customer.

Accordingly, it is an object in one aspect of an embodiment of the invention to provide an information processing program, an information processing method, and an information processing device that make it possible to provide information corresponding to a relationship between a first object corresponding to a customer and a second object corresponding to a product.

Preferred embodiments of the present invention will be explained with reference to accompanying drawings. The embodiment does not limit the disclosure.

(a) First Embodiment

Figure 1:
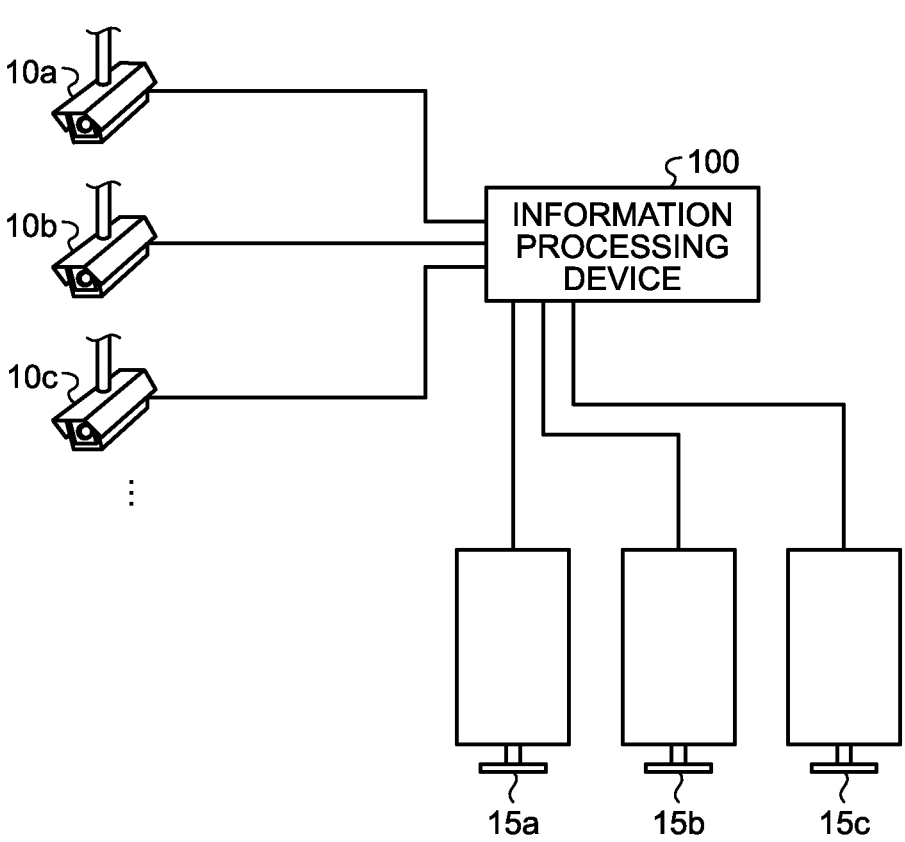
FIG. 1 is a diagram illustrating an example of a system according to a first embodiment.

FIG. 1 is a diagram illustrating an example of a system according to a first embodiment. As illustrated in FIG. 1, the system includes cameras 10a, 10b and 10c and display devices 15a, 15b and 15c, and an information processing device 100. The cameras 10a to 10c and the information processing device 100 are connected to each other via a network. The display devices 15a to 15c and the information processing device 100 are connected to each other via the network.

For the convenience of description, FIG. 1 illustrates only the cameras 10a to 10c and the display devices 15a to 15c; however, the system according to the first embodiment may include another camera and another display device.

The cameras 10a to 10c are set in given positions in a store. A plurality of goods are arranged in the store. The positions (sets of coordinates) in which the cameras 10a to 10c are set are positions different from one another. In the following description, when not particularly distinguished from one another, the cameras 10a to 10c are referred to as "cameras 10".

The camera 10 captures an video of the inside of the store and transmits data of the captured video to the information processing device 100. The data of the video that the cameras 10 transmit to the information processing device 100 is referred to as "video data".

The video data contains a plurality of image frames in time series. Frame numbers are assigned to the respective frames in an ascending order in time series. An image frame is a still image that is captured by the camera 10 at certain timing. Time data may be assigned to each image frame. Camera identification information that identifies the camera 10 that captures video data is set in the video data.

The display devices 15a to 15c are set in given positions in the store and, for example, are set around products. The positions (sets of coordinates) in which the display devices 15a to 15c are set are positions different from one another. In the following description, when not particularly distinguished from one another, the display devices 15a to 15c are referred to as "display devices 15". The display device 15 displays information on a product that is output from the information processing device 100, or the like.

The information processing device 100 acquires the video data of the inside of the store from the camera 10 and analyzes the acquired video data, thereby specifying a first area containing a customer of subject who purchases a product in the store, a second area containing a product, and a relationship that identifies interaction between the customer and the product. Based on the specified relationship, the information processing device 100 selects a machine learning model from a plurality of machine learning models that are stored in a storage unit. Accordingly, it is possible to select a machine learning model that is relevant to a customer and a person and, by utilizing the machine learning model, it is possible to provide information corresponding to the relationship between the customer and the person.

Figure 2:
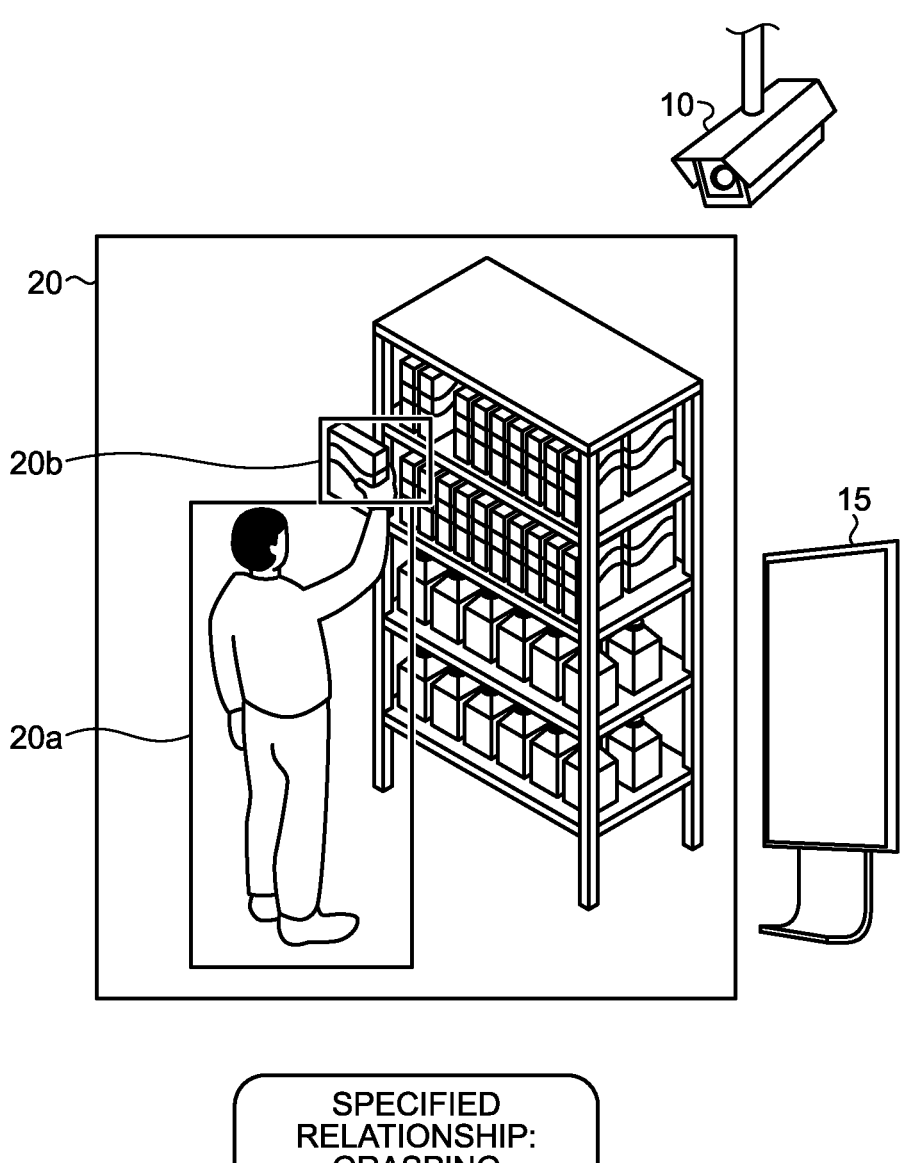
FIG. 2 is Diagram (1) for describing a process performed by an information processing device according to the first embodiment.

FIG. 2 and FIG. 3 are diagrams for describing a process performed by the information processing device according to the first embodiment. First of all, FIG. 2 will be described. For example, the information processing device 100 analyzes video data 20 that is captured by the camera 10, thereby specifying a first area 20a containing the customer, a second area 20b containing a product, and a relationship between the customer and the product. In the example illustrated in FIG. 2, the relationship between the person and the product is referred to as "grasping". The display device 15 is set near the product that is contained in the first area 20a.

Note that, in the example illustrated in FIG. 2, the relationship between the first area 20a and the second area 20b is described as "grasping" and the relationship includes other relationships of "looking at", "touching", and "sitting".

A shift to description of FIG. 3 is made. The information processing device 100 has a plurality of machine learning models. FIG. 3 illustrates machine learning models 30a, 30b and 30c. For example, the machine learning model 30a is a machine learning model that is dedicated to the relationship of "looking at". The machine learning model 30b is a machine learning model that is dedicated to the relationship of "touching". The machine learning model 30c is a machine learning model that is dedicated to the relationship of "grasping". The machine learning models 30a to 30c are neural networks (NN), or the like.

The machine learning model 30a is trained previously by a plurality of sets of first training data corresponding to the relationship of "looking at". For example, an input of the first training data is image data of a product and an output (truth label) is product information. The product information of the first training data is "product advertisement information", or the like.

The machine learning model 30b is trained previously by a plurality of sets of second training data corresponding to the relationship of "touching". For example, an input of the second training data is the image data of the product and an output (truth label) is product information. The product information of the second training data is "information describing advantages of the product", "information describing popularity of the product", etc.

The machine learning model 30c is trained previously by a plurality of sets of third training data corresponding to the relationship of "grasping". For example, an input of the third training data corresponding to the relationship of "grasping" is the image data of the product and an output (truth label) is product information. The product information of the third training data is "information describing a benefit that is earned by purchasing the product", or the like.

The information processing device 100 selects a machine learning model corresponding to the relationship that is specified by the process described using FIG. 2 from the machine learning models 30a to 30c. For example, when the specified relationship is "grasping", the information processing device 100 selects the machine learning model 30c in FIG. 3.

By inputting the image data of the second area 20b containing the product to the selected machine learning model 30c, the information processing device 100 specifies product information on the product contained in the second area 20b. The information processing device 100 outputs the specified product information to the display device 15 that is arranged near the product contained in the second area and causes the display device 15 to display the specified product information to induce the customer to refer to the product information. The product information that is referred to by the customer is information that is output from the machine learning model based on the relationship between the customer and the product and makes it possible to increase the motivation of the customer to purchase the product. The product information is an example of "relevant information" relevant to the product that is contained in the second area.

Using a HOID (Human Object Interaction Detection), the information processing device 100 specifies a first area containing a customer, a second area containing a product, and a relationship between the first area and the second area. By inputting video data (image frames in time series) to the HOID, the information processing device 100 outputs the first area, the second area, and the information on the relationship.

An example of a HOID training process that the information processing device 100 executes will be described.

Using a plurality of sets of training data, the information processing device 100 trains the HOID that identifies a first class representing a person, a second class representing an object, and a relationship between the first class and the second class.

Each set of training data includes image data (image frame) serving as input data and truth information that is set with respect to the image data.

In the truth information, human and object classes to be detected, a class presenting interaction between the human and the object, and bounding boxes (Bbox) representing areas of the respective classes are set. For example, an area information of a Something class presenting the object and an area information of the class of the human presenting the user, and the relationship presenting interaction between the Something class and the human class are set as the truth information.

It is possible to set a plurality of classes and a plurality of interactions also in the training data and the trained HOID is able to recognize the classes and the interactions.

In general, when a Something class is generated in normal object recognition, all things irrelevant to a task, such as all the background, accessories and small items, are detected. Furthermore, because they are all Something, a large number of boxes are only recognized in the image data and nothing is identified. In the case of the HOID, a special relationship of the human with the object (in some cases, another relationship of grasping, sitting, or operating) is presented and thus it can be utilized as significant information for the task.

Figure 4:
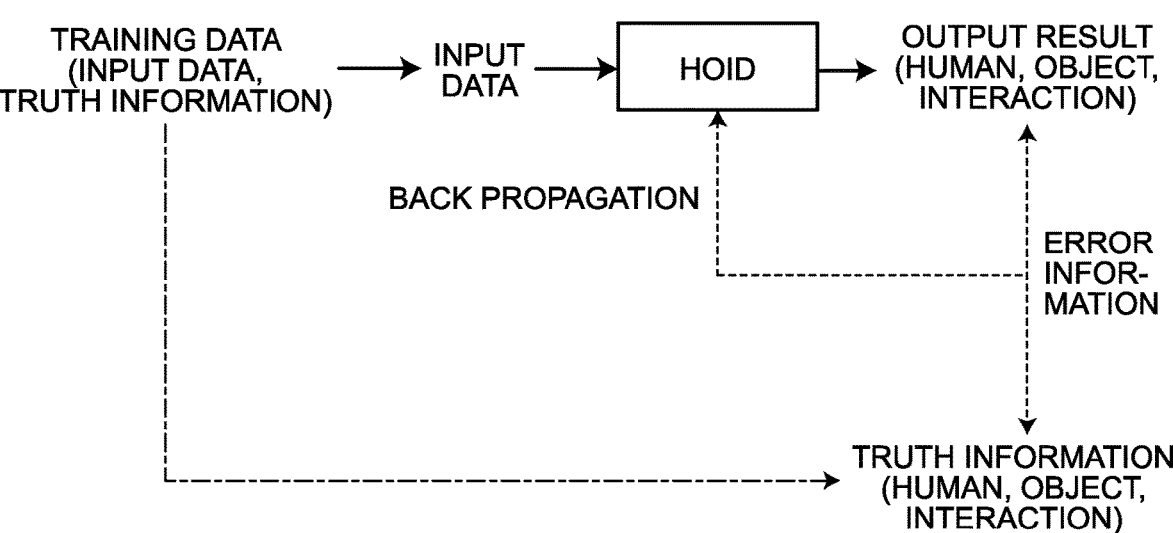
FIG. 4 is a diagram illustrating machine learning of HOID.

FIG. 4 is a diagram illustrating machine learning of the HOID. As illustrated in FIG. 4, the information processing device 100 inputs input data of training data to the HOID and acquires an output result of the HOID. The output result contains the human class and the object class that are detected by the HOID and interaction between the human and the object. The information processing device 100 calculates information on an error between the truth information of the training data and the output result of the HOID and executes machine learning of the HOID by back propagation such that the error is reduced.

An example of an identifying process using the HOID will be described. The information processing device 100 inputs each image frame of the video data that is captured by the camera 10 to the HOID and acquires an output result of the HOID. The output result of the HOID contains a human Bbox, an object Bbox, a probability value of interaction between a human and an object (a probability value of each relationship), and a class name. The human Bbox corresponds to the first area described above. The object Bbox corresponds to the second area described above. Based on the output result of the HOID, the information processing device 100 specifies a relationship. For example, the information processing device 100 specifies a relationship with the largest probability value as a relationship between the first area and the second area.

As described above, by inputting the video data to the HOID, the information processing device 100 is able to specify the first area, the second area, and the relationship. Note that the information processing device 100 may store the trained HOID previously in the storage unit and, using the trained HOID, specify the first area, the second area, and the relationship.

Figure 5:
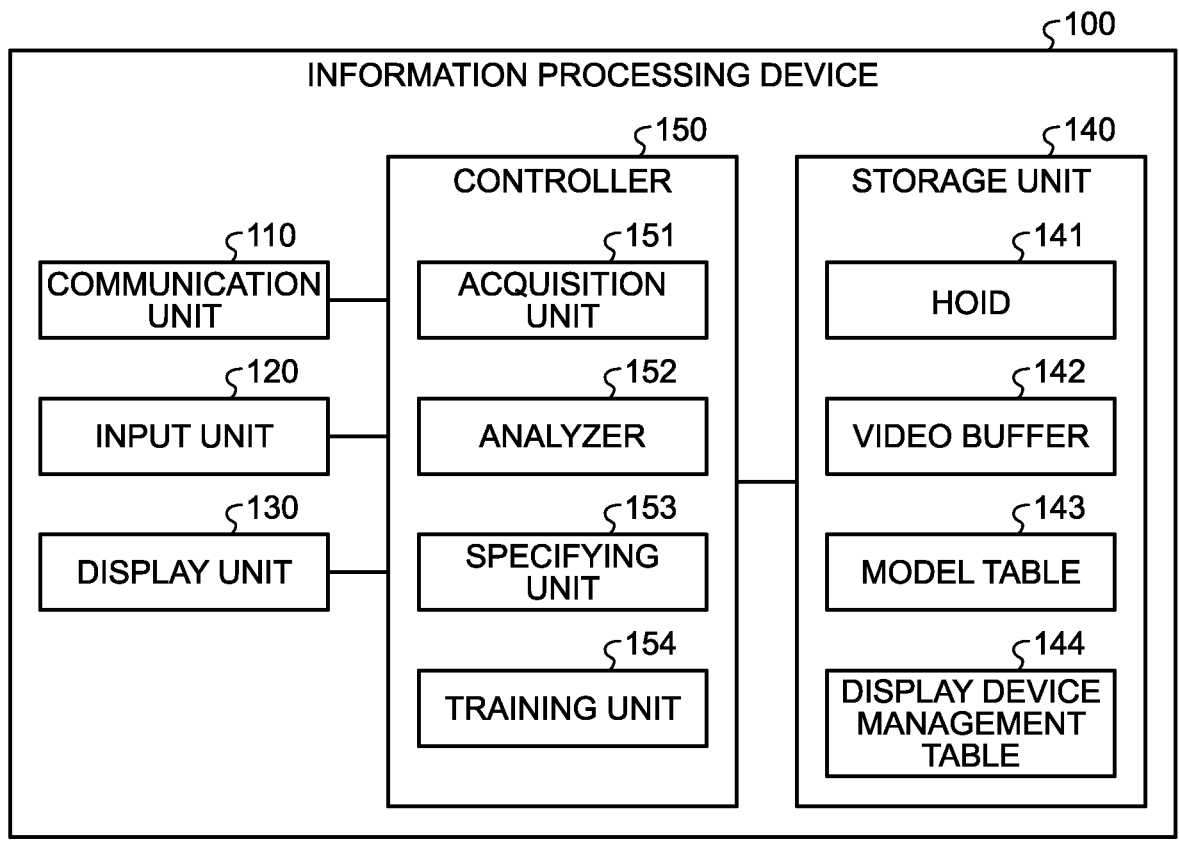
FIG. 5 is a functional block diagram illustrating a configuration of the information processing device according to the first embodiment.

An example of a configuration of the information processing device 100 that executes the process illustrated in FIG. 2 and FIG. 3 will be described next. FIG. 5 is a functional block diagram illustrating the configuration of the information processing device according to the first embodiment. As illustrated in FIG. 5, the information processing device 100 includes a communication unit 110, an input unit 120, a display unit 130, a storage unit 140, and a controller 150.

The communication unit 110 executes data communication with the camera 10, the display device 15, an external device, etc., via the network. The communication unit 110 is a network interface card (NIC), or the like. For example, the communication unit 110 receives video data from the camera 10.

The input unit 120 is an input device that inputs various types of information to the controller 150 of the information processing device 100. For example, the input unit 120 corresponds to a keyboard and a mouse or a touch panel.

The display unit 130 is a display device that displays information that is output from the controller 150.

The storage unit 140 includes a HOID 141, a video buffer 142, a model table 143, and a display device management table 144. The storage unit 140 is a storage device, such as a memory.

The HOID 141 is the HOID that is described using FIG. 4, etc. An image frame of the video data is input to the HOID 141 and accordingly a first area and a second area on the image frame and a relationship between the first area (an object contained in the first area) and the second area (an object contained in the second area) are output.

The video buffer 142 stores the video data that is captured by the camera 10. For example, the video buffer 142 stores the video data in association with the camera identification information.

The model table 143 stores information on the machine learning models 30a to 30c described using FIG. 3. FIG. 6 is a diagram illustrating an example of a data structure of the model table according to the first embodiment. As illustrated in FIG. 6, the model table 143 associates model identification information, a relationship, and a machine learning model. The model identification information is information that uniquely identifies the machine learning model. The relationship represents the relationship corresponding to the machine leaning model. The machine learning model is an NN in which image data (image frame) is an input and product information is an output.

For example, model identification information "M30*a*" represents the machine learning model 30a. The machine learning model 30a is the machine learning model corresponding to the relationship of "looking at". Model identification information "M30*b*" represents the machine learning model 30b. The machine learning model 30b is the machine learning model corresponding to the relationship of "touching". Model identification information "M30*c*" represents the machine learning model 30c. The machine learning model 30c is the machine learning model corresponding to the relationship of "grasping".

The display device management table 144 stores information on the display devices 15. FIG. 7 is a diagram illustrating an example of a data structure of the display device management table according to the first embodiment. As illustrated in FIG. 7, the display device management table 144 associates display device identification information, a position, and the camera identification information.

The display device identification information is information that uniquely identifies the display device 15. For example, sets of display device identification information of the display devices 15a, 15b and 15c are A15*a*, A15*b* and A15*c*, respectively. The position represents the position (set of coordinates) of the display device 15. The camera identification information is information that identifies the camera 10 that is the closest to the display device 15. For example, the sets of camera identification information C10a, C10b and C10c correspond to the cameras 10a, 10b and 10c illustrated in FIG. 1.

For example, in FIG. 7, the display device 15a of the display device identification information "A15a" is set in a position "(x₁, y₁)" and information indicating that the camera 10 that is the closest to the display device 15a is the camera 10a corresponding to the camera identification information "C10a" is registered.

Back to description to FIG. 5. The controller 150 includes an acquisition unit 151, an analyzer 152, a specifying unit 153, and a training unit 154. The controller 150 is a central processing unit (CPU), a graphics processing unit (GPU), or the like.

The acquisition unit 151 acquires the video data from the camera 10. As described above, the camera identification information of the camera 10 that captures the video data is set in the video data. The acquisition unit 151 stores the video data in association with the camera identification information in the video buffer 142.

The analyzer 152 acquires the video data from the video buffer 142 and analyzes the video data, thereby specifying the first area, the second area, and the relationship. The relationship is a relationship between "the first object contained in the first area" and "the second object contained in the second area". For example, the analyzer 152 inputs the image frame (image data) in time series contained in the video data to the HOID 141 and specifies the first area and the second area on each image frame and the relationship.

By executing the above-described process repeatedly, the analyzer 152 specifies a first area, a second area, and a relationship per image frame in time series. When specifying a first area, a second area, and a relationship repeatedly, the analyzer 152 tracks a customer contained in the first area and a product in the second area. The analyzer 152 generates information of an analysis result of the above-described process and outputs the information to the specifying unit 153. In the following description, the information of the analysis result is referred to as "analysis result information". For example, in the analysis result information, image data of the first area containing the person who is being tracked, image data of the second area containing the product that is being tracked, the relationship, and the camera identification information of the camera 10 that captures the video data (image frame) are associated with one another.

Based on the relationship contained in the analysis result information, the specifying unit 153 selects a machine learning model corresponding to the relationship from the machine learning models that are registered in the model table 143. The specifying unit 153 inputs the image data of the second area contained in the analysis result information to the selected machine learning model and acquires product information that is output from the selected machine learning model (specifies the product information).

For example, when the relationship contained in analysis result information is "gripping", the specifying unit 153 selects the machine learning model 30c corresponding to "gripping" from the model table 143. By inputting the image data of the second area to the selected machine learning model 30c, the specifying unit 153 specifies the product information.

Based on the camera identification information contained in the analysis result information and the display device management table 144, the specifying unit 153 specifies the display device identification information for displaying the product information. For example, when the camera identification information contained in the analysis result information is "C10a", the specifying unit 153 specifies the display device identification information "A15a (the display device 15a)" for displaying the product information. The specifying unit 153 outputs the product information to the specified display device 15a and causes the display device 15a to display the product information.

The specifying unit 153 may calculate a position of the customer from the coordinates of the second area (customer) on the image frame and the camera parameter of the camera 10 corresponding to the camera identification information and compare the calculated position with each distance in the display device management table 144. The specifying unit 153 specifies the display device identification information enabling the shortest distance from the calculated position, outputs the product information to the display device 15 corresponding to the specified display device identification information, and causes the display device 15 to display the product information.

Based on the sets of training data, the training unit 154 executes machine learning of the HOID 141. The training unit 154 acquires the sets of training data previously. The training unit 154 inputs the training data to the HOID 141, calculates error information between truth information of the training data and the output result of the HOID 141, and executes machine learning of the HOID 141 by back propagation such that the error is reduced. Other description of machine learning is similar to the content described using FIG. 4.

The training unit 154 may execute machine learning of the machine learning models 30a, 30b and 30c contained in the model table 143.

Based on the sets of first training data, the training unit 154 trains the machine learning model 30a. The training unit 154 inputs the first training data, calculates error information between a truth label of the first training data and an output result of the machine learning model 30a, and executes machine learning of the machine learning model 30a by back propagation such that the error is reduced.

Based on the sets of second training data, the training unit 154 trains the machine learning model 30b. The training unit 154 inputs the second training data, calculates error information between a truth label of the second training data and an output result of the machine learning model 30b, and executes machine learning of the machine learning model 30b by back propagation such that the error is reduced.

Based on the sets of third training data, the training unit 154 trains the machine learning model 30c. The training unit 154 inputs the third training data, calculates error information between a truth label of the third training data and an output result of the machine learning model 30c, and executes machine learning of the machine learning model 30c by back propagation such that the error is reduced.

Figure 8:
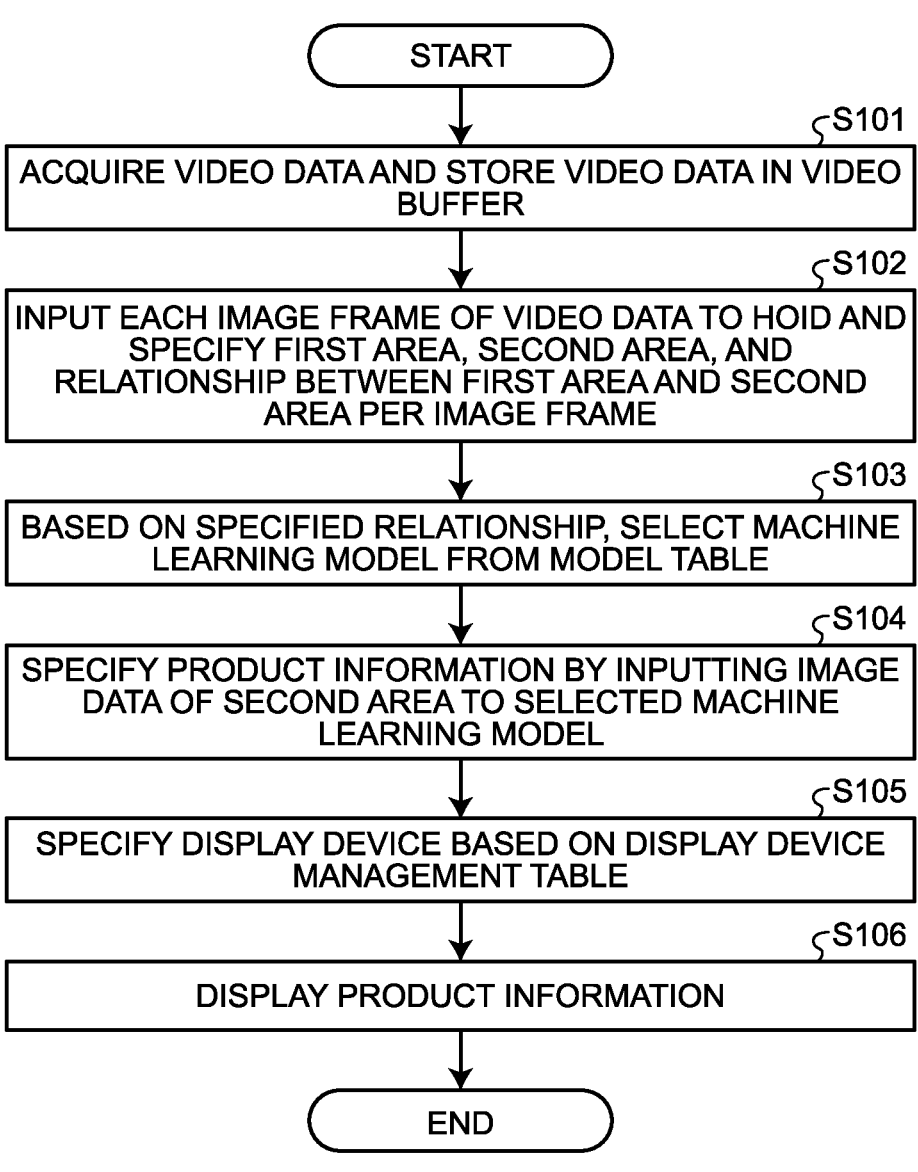
FIG. 8 is a flowchart illustrating a procedure of the process performed by the information processing device according to the first embodiment.

A procedure of the process performed by the information processing device 100 according to the first embodiment will be described next. FIG. 8 is a flowchart illustrating the procedure of the process performed by the information processing device according to the first embodiment. As illustrated in FIG. 8, the acquisition unit 151 of the information processing device 100 acquires video data from the camera 10 and stores the video data in the video buffer 142 (step S101).

The analyzer 152 of the information processing device 100 inputs each image frame of the video data to the HOID 141 and specifies a first area, a second area, and a relationship between the first area and the second area per image frame (step S102).

Based on the specified relationship, the specifying unit 153 of the information processing device 100 selects a machine learning model from the model table 143 (step S103). By inputting image data of the second area to the selected machine learning model, the specifying unit 153 specifies product information (step S104).

Based on the display device management table 144, the specifying unit 153 specifies the display device 15 (step S105). The specifying unit 153 causes the display device to display product information (step S106).

An effect of the information processing device 100 according to the first embodiment will be described next. The information processing device 100 acquires video data of the inside of the store and analyzes the acquired video data, thereby specifying a first area containing a customer of subject who purchases a product in the store, a second area containing a product, and a relationship that identifies interaction between the customer and the product. Based on the specified relationship, the information processing device 100 selects a machine learning model from the machine learning models that are stored in the storage unit 140. Accordingly, it is possible to select a machine learning model that is relevant to a customer and a person and, by utilizing the machine learning model, it is possible to provide information corresponding to the relationship between the customer and the person.

The information processing device 100 specifies product information by inputting image data of the second area to the selected machine learning model and outputs the specified product information to the display device 15 and the product information is displayed. The product information is information that is output from the machine learning model based on the relationship between the customer and the product and presenting the product information to the customer makes it possible to increase the motivation of the customer to purchase the product.

The information processing device 100 according to the first embodiment causes the display device 15 to display the product information; however, the display is not limited to this, and the product information may be displayed on a terminal device that the customer uses. The terminal device that the customer uses may be an accounting machine, a digital signage, a smart card, or the like.

For example, when performing the above-described process per image frame in time series, the analyzer 152 of the information processing device 100 performs tracking of the customer contained in the first area. Based on the camera parameter of the camera 10 that captures the video data and the coordinates in the first area on the image frame, the analyzer 152 specifies the position of the customer in the store. Based on the specified position of the customer in the store, the analyzer 152 specifies the terminal device that the customer uses, outputs the product information to the specified terminal device, and causes the terminal device to display the product information. Accordingly, the information processing device 100 is able to efficiently represent the product information to the customer.

(b) Second Embodiment

Figure 9:
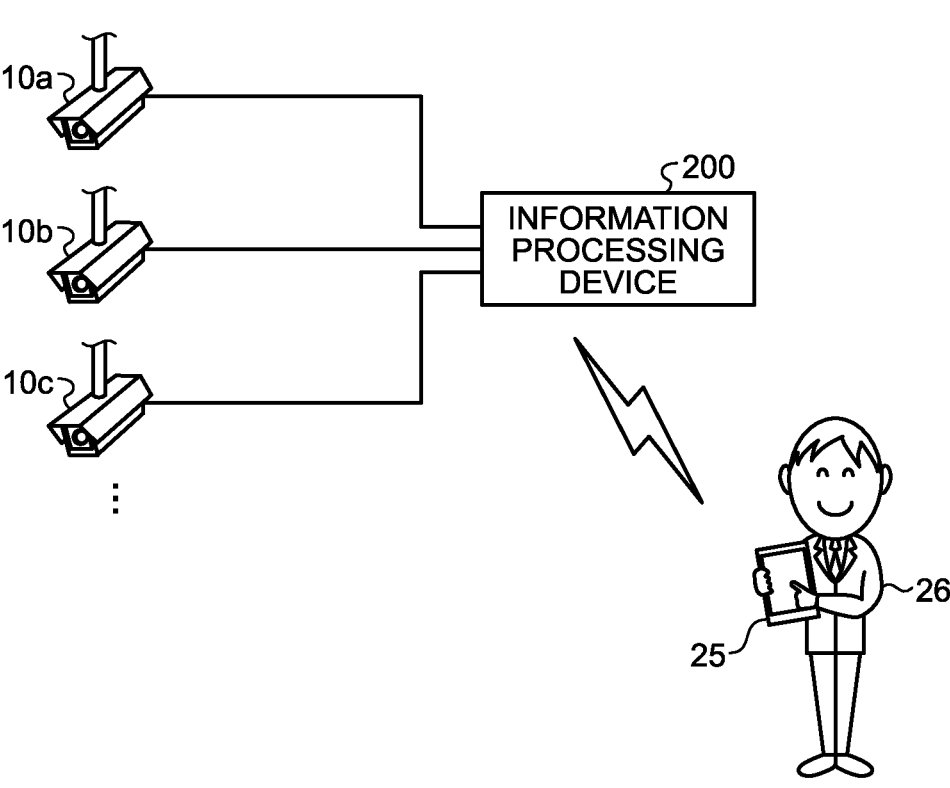
FIG. 9 is a diagram illustrating an example of a system according to a second embodiment.

FIG. 9 is a diagram illustrating an example of a system according to a second embodiment. As illustrated in FIG. 9, the system includes the cameras 10a, 10b and 10c, a terminal device 25 that a sales staff 26 holds, and an information processing device 200. The cameras 10a to 10c and the information processing device 200 are connected to each other via a network. The terminal device 25 and the information processing device 200 are connected to each other via a network (wireless).

For the convenience of description, FIG. 9 illustrates only the cameras 10a to 10c and the terminal device 25; however, the system according to the second embodiment may include another camera and another terminal device.

The cameras 10a to 10c are set in given positions in a store. In the following description, when not particularly distinguished from one another, the cameras 10a to 10c are referred to as the "cameras 10". The camera 10 transmits video data to the information processing device 200. Other descriptions of the camera 10 are the same as the content described in the first embodiment.

The sales staff 26 holds the terminal device 25. The terminal device 25 displays serving-customer information for assisting in serving the customer that is output from the information processing device 200.

The information processing device 200 acquires video data of the inside of the store from the camera 10 and analyzes the acquired video data, thereby specifying a first area containing a customer of subject who purchases a product in the store, a second area containing a product, and a relationship that identifies interaction between the customer and the product. Based on the specified relationship, the information processing device 200 selects a serving-customer model from a plurality of serving-customer models that are stored in a storage unit. Accordingly, it is possible to select a serving-customer model that is relevant to a customer and a person and, by using the serving-customer model, it is possible to provide information (serving-customer information) that corresponds to the relationship between the customer and the person and that enables an assist in serving the customer to the sales staff 26, or the like. Note that the serving-customer information is an example of "relevant information" that is relevant to the product that is contained in the second area. The serving-customer information is also information on the content of serving a customer that is for the customer contained in the first area and that is relevant to the product contained in the second area.

Figure 10:
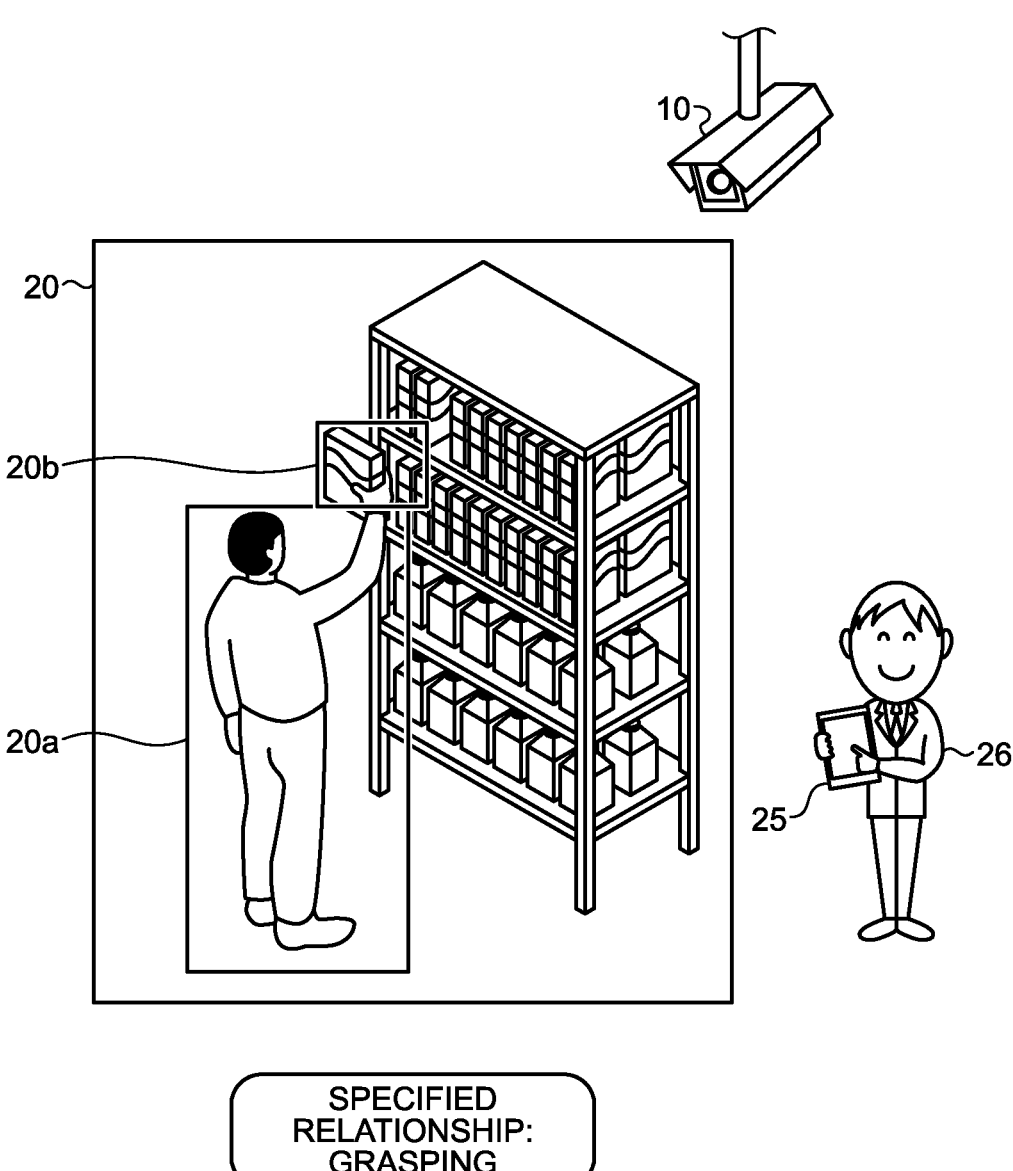
FIG. 10 is Diagram (1) for describing a process performed by an information processing device according to the second embodiment.
Figure 11:
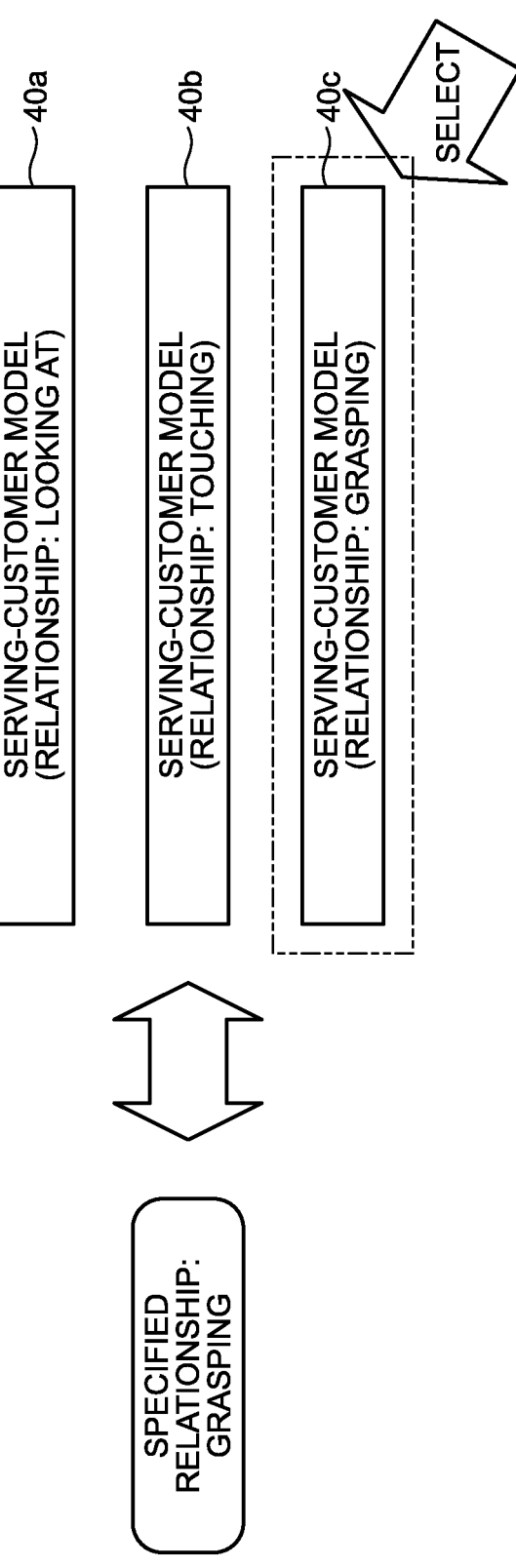
FIG. 11 is Diagram (2) for describing the process performed by the information processing device according to the second embodiment.

FIG. 10 and FIG. 11 are diagrams for describing a process performed by the information processing device according to the second embodiment. First of all, FIG. 10 will be described. For example, the information processing device 200 analyzes the video data 20 that is captured by the camera 10, thereby specifying the first area 20a containing a customer, the second area 20b containing a product, and a relationship between the customer and the product. In the example illustrated in FIG. 10, the relationship between the person and the product is referred to as "grasping". The sales staff 26 stands by the product.

Note that, in the example illustrated in FIG. 10, the relationship between the first area 20a and the second area 20b is described as "grasping" and the relationship includes other relationships of "looking at", "touching", and "sitting".

A shift to description of FIG. 11 is made. The information processing device 200 has a plurality of serving-customer models. FIG. 11 illustrates serving-customer models 40a, 40b and 40c. For example, the serving-customer model 40a is a machine learning model that is dedicated to the relationship of "looking at". The serving-customer model 40b is a machine learning model that is dedicated to the relationship of "touching". The serving-customer model 40c is a machine learning model that is dedicated to the relationship of "grasping". The serving-customer models 40a to 40c are NNs, or the like.

The serving-customer model 40a is trained previously by a plurality of sets of fourth training data corresponding to the relationship of "looking at". For example, an input of the fourth training data corresponding to the relationship of "looking at" is image data of the product and an output (truth label) is information of the content of serving the customer who is looking at the product (serving-customer information below). The serving-customer information for the customer who is looking at the product is "presenting the product in a different color", "recommending another product", or the like.

The serving-customer model 40b is trained previously by a plurality of sets of fifth training data corresponding to the relationship of "touching". For example, an input of the fifth training data corresponding to the relationship of "touching" is the image data of the product and an output (truth label) is serving-customer information for the customer who is touching the product. The serving-customer information for the customer who is touching the product is "explaining advantages of the product", "explaining popularity of the product", or the like.

The serving-customer model 40c is trained previously by a plurality of sets of sixth training data corresponding to the relationship of "grasping". For example, an input of the sixth training data corresponding to the relationship of "grasping" is the image data of the product and an output (truth label) is serving-customer information for the customer who is grasping the product. The serving-customer information for the customer who is grasping the product is "presenting performance of the product", "explaining a period advantageous to purchase the product, or the like.

The information processing device 200 selects a serving-customer model corresponding to the relationship that is specified by the process described using FIG. 10 from the serving-customer models 40a to 40c. For example, when the specified relationship is "grasping", the information processing device 200 selects the serving-customer model 40c.

By inputting an image of the second area containing the product to the selected serving-customer model 40c, the information processing device 200 specifies serving-customer information for the product contained in the second area. The information processing device 200 outputs the specified serving-customer information to the terminal device 25 that the sales staff 26 uses and causes the terminal device 25 to display the specified serving-customer information. By referring to the serving-customer information, the sales staff 26 is able to appropriately serve the customer contained in the first area.

Figure 12:
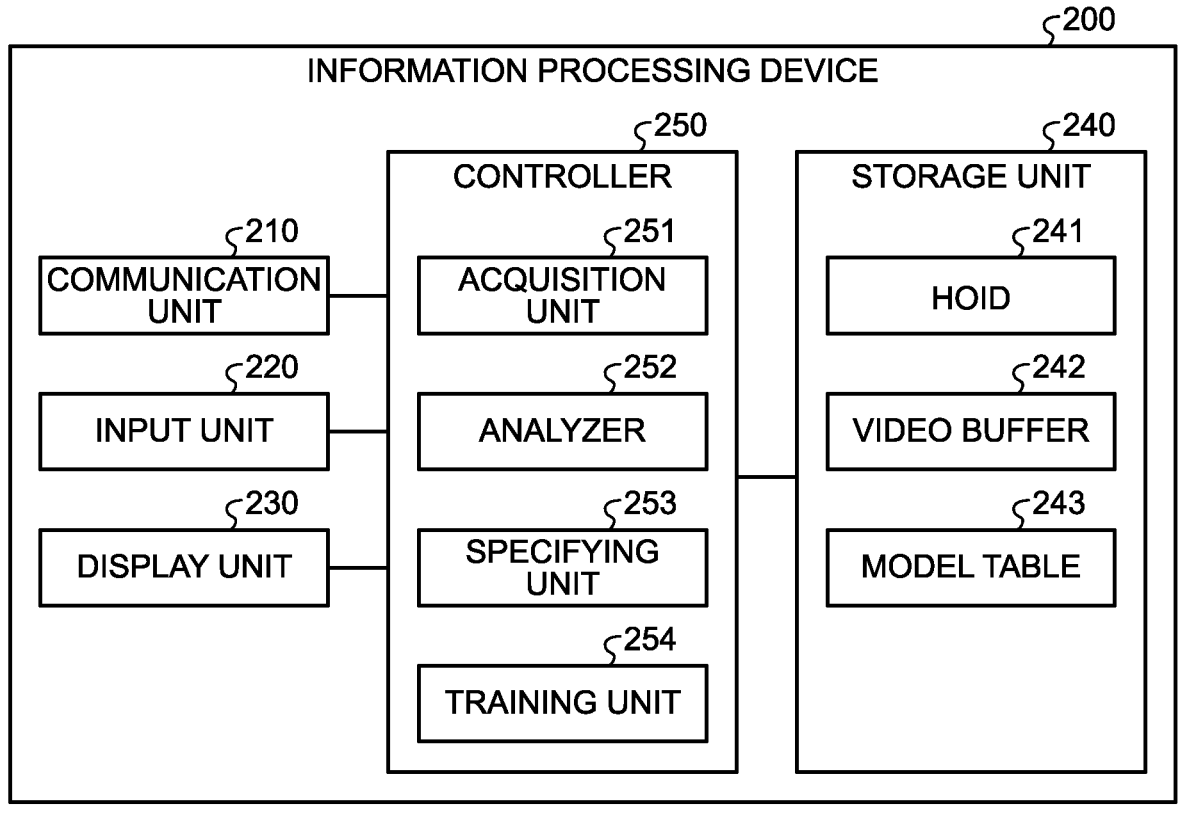
FIG. 12 is a functional block diagram illustrating a configuration of the information processing device according to the second embodiment.

An example of a configuration of the information processing device 200 that executes the process illustrated in FIG. 10 and FIG. 11 will be described next. FIG. 12 is a functional block diagram illustrating the configuration of the information processing device according to the second embodiment.

Description of a communication unit 210, an input unit 220, and a display unit 230 is the same as that of the communication unit 110, the input unit 120, and the display unit 130 described using FIG. 5.

A storage unit 240 includes a HOID 241, a video buffer 242, and a model table 243. The storage unit 240 is a storage device, such as a memory.

Description of the video buffer 242 is the same as that of the HOID 141 and the video buffer 142 described in the first embodiment.

The model table 243 stores information on the serving-customer models 40a to 40c described using FIG. 11. FIG. 13 is a diagram illustrating an example of a data structure of the model table according to the second embodiment. As illustrated in FIG. 13, the model table 243 associates model identification information, a relationship, and a serving-customer model. The model identification information is information that uniquely identifies the serving-customer model. The relationship represents the relationship corresponding to the serving-customer model. The serving-customer model is an NN in which image data (image frame) is an input and serving-customer information is an output.

For example, model identification information "M40a" represents the serving-customer model 40a. The serving-customer model 40a is a serving-customer model corresponding to the relationship of "looking at". Model identification information "M40b" represents the serving-customer model 40b. The serving-customer model 40b is a serving-customer model corresponding to the relationship of "touching". Model identification information "M40c" represents the serving-customer model 40c. The serving-customer model 40c is a serving-customer model corresponding to the relationship of "grasping". Back to description of FIG. 12. A controller 250 includes an acquisition unit 251, an analyzer 252, a specifying unit 253, and a training unit 254. The controller 250 is a CPU, a GPU, or the like.

The acquisition unit 251 acquires the video data from the camera 10. As described above, the camera identification information of the camera 10 that captures the video data is set in the video data. The acquisition unit 251 stores the video data in association with the camera identification information in the video buffer 242.

The analyzer 252 acquires the video data from the video buffer 242 and analyzes the video data, thereby specifying the first area, the second area, and the relationship. The relationship is a relationship between "the first object contained in the first area" and "the second object contained in the second area". For example, the analyzer 252 inputs the image frame (image data) in time series contained in the video data to the HOID 241 and specifies the first area and the second area on each image frame and the relationship.

By executing the above-described process repeatedly, the analyzer 252 specifies a first area, a second area, and a relationship per image frame in time series. When specifying a first area, a second area, and a relationship repeatedly, the analyzer 252 tracks a customer contained in the first area and a product in the second area. The analyzer 252 generates information of an analysis result of the above-described process and outputs the information to the specifying unit 253. In the following description, the information of the analysis result is referred to as "analysis result information". For example, in the analysis result information, image data of the first area containing the person who is being tracked, image data of the second area containing the product that is being tracked, and the relationship are associated.

Based on the relationship contained in the analysis result information, the specifying unit 253 selects a serving-customer model corresponding to the relationship from the serving-customer models that are registered in the model table 243. The specifying unit 253 inputs the image data of the second area contained in the analysis result information to the selected serving-customer model and acquires serving-customer information that is output from the selected serving-customer model (specifies the serving-customer information).

For example, when the relationship contained in the analysis result information is "gripping", the specifying unit

253 selects the serving-customer model 40c corresponding to "gripping" from the model table 243. By inputting the image data of the second area to the selected serving-customer model 40c, the specifying unit 153 specifies the serving-customer information.

The specifying unit 253 outputs the serving-customer information to the terminal device 25 that the sales staff 26 holds and causes the terminal device 25 to display the serving-customer information.

Based on the sets of training data, the training unit 154 executes machine learning of the HOID 241. The training unit 254 acquires the sets of training data previously. The training unit 254 inputs the training data to the HOID 241, calculates error information between truth information of the training data and the output result of the HOID 241, and executes machine learning of the HOID 141 by back propagation such that the error is reduced. Other description of machine learning is similar to the content described using FIG. 4.

The training unit 254 may execute machine learning of the serving-customer models 40a, 40b and 40c contained in the model table 243.

Based on the sets of fourth training data, the training unit 254 trains the serving-customer model 40a. The training unit 154 inputs the fourth training data, calculates error information between a truth label of the fourth training data and an output result of the serving-customer model 40a, and executes machine learning of the serving-customer model 40a by back propagation such that the error is reduced.

Based on the sets of fifth training data, the training unit 254 trains the serving-customer model 40b. The training unit 254 inputs the fifth training data, calculates error information between a truth label of the fifth training data and an output result of the serving-customer model 40b, and executes machine learning of the serving-customer model 40b by back propagation such that the error is reduced.

Based on the sets of sixth training data, the training unit 254 trains the serving-customer model 40c. The training unit 254 inputs the sixth training data, calculates error information between a truth label of the sixth training data and an output result of the serving-customer model 40c, and executes machine learning of the serving-customer model 40c by back propagation such that the error is reduced.

A procedure of the process performed by the information processing device 200 according to the second embodiment will be described next. FIG. 14 is a flowchart illustrating the procedure of the process performed by the information processing device according to the second embodiment. As illustrated in FIG. 14, the acquisition unit 251 of the information processing device 200 acquires video data from the camera 10 and stores the video data in the video buffer 242 (step S201).

The analyzer 252 of the information processing device 200 inputs each image frame of the video data to the HOID 241 and specifies a first area, a second area, and a relationship between the first area and the second area per image frame (step S202).

Based on the specified relationship, the specifying unit 253 of the information processing device 200 selects a serving-customer model from the model table 243 (step S203). By inputting image data of the second area to the selected serving-customer model, the specifying unit 253 specifies serving-customer information (step S204). The specifying unit 253 causes the terminal device to display the serving-customer information (step S205).

An effect of the information processing device 200 according to the second embodiment will be described next.

The information processing device 200 acquires video data of the inside of the store and analyzes the acquired video data, thereby specifying a first area containing a customer of subject who purchases a product in the store, a second area containing a product, and a relationship that identifies interaction between the customer and the product. Based on the specified relationship, the information processing device 200 selects a serving-customer model from the serving-customer models that are stored in the storage unit 240. By inputting image data of the second area to the selected serving-customer model, the information processing device 200 specifies serving-customer information and outputs the specified serving-customer information to the terminal device 25, so that the serving-customer information is displayed. The serving-customer information is information that is output from the serving-customer model based on the relationship between the customer and the product and presenting the serving-customer information to the sales staff 26 enables the sales staff 26 to serve the customer such that the motivation of the customer to purchase the product is increased.

Figure 15:
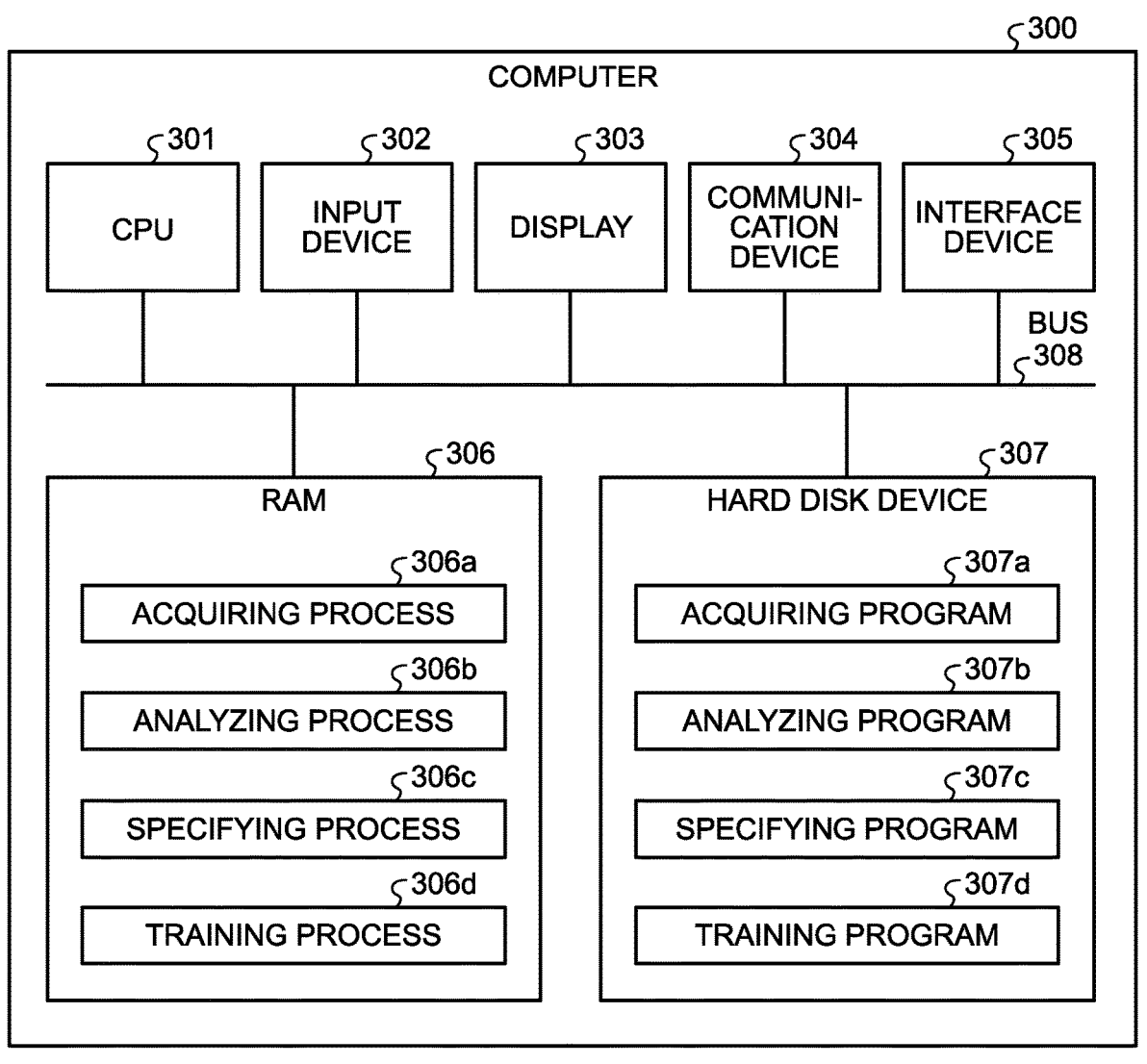
FIG. 15 is a diagram illustrating an example of a hardware configuration of a computer that implements the same functions as those of the information processing device of the embodiment.

An example of a hardware configuration of a computer that realizes the same functions as those of the above-descried information processing devices 100 and 200 will be described next. FIG. 15 is a diagram illustrating an example of a hardware configuration of a computer that realizes the same functions as those of the information processing devices of the embodiments.

As illustrated in FIG. 15, a computer 300 includes a CPU 301 that executes various types of computing, an input device 302 that receives inputs of data from a user, and a display 303. The computer 300 further includes a communication device 304 that communicates data with an external device, or the like, via a wired or wireless network and an interface device 305. The computer 300 includes a RAM 306 that temporarily stores various types of information and a hard disk device 307. Each of the devices 301 to 307 is connected to a bus 308.

A hard disk device 307 includes an acquiring program 307a, an analyzing program 307b, a specifying program 307c, and a training program 307d. The CPU 301 reads each of the programs 307a to 307d and loads the program into the RAM 306.

The acquiring program 307a functions as an acquiring process 306a. The analyzing program 307b functions as an analyzing process 306b. The specifying program 307c functions as a specifying process 306c. The training program 307d functions as a training process 306d.

A process of the acquiring process 306a corresponds to the processes performed by the acquisition units 151 and 251. A process of the analyzing process 306b corresponds to the processes performed by the analyzers 152 and 252. A process of the specifying process 306c corresponds to the processes performed by the specifying units 153 and 253. A process of the training process 306d corresponds to the processes performed by the training units 154 and 254.

Each of the programs 307a to 307d need not necessarily be stored in the hard disk device 307 from the beginning. For example, each of the programs may be stored in a "portable physical medium", such as a flexible disk (FD), a CD-ROM, a DVD, a magneto-optical disk, or an IC card that is inserted into the computer 300. The computer 300 may read and execute each of the programs 307a to 307d of the computer 300.

It is possible to provide information corresponding to a relationship between a first object corresponding to a customer and a second object corresponding to a product.

All examples and conditional language recited herein are intended for pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although the embodiments of the present invention have been described in detail, it should be understood that the various changes, substitutions, and alterations could be made hereto without departing from the spirit and scope of the invention.

What is claimed is:

1. A non-transitory computer-readable recording medium having stored therein an information processing program that causes a computer to execute a process comprising:
acquiring a video;
analyzing the acquired video;
identifying, based on a result of the analyzing, a first area containing a first object included in the acquired video, a second area containing a second object included in the acquired video, and a relationship that identifies interaction between the first object and the second object, the relationships being a first relationship, a second relationship or a third relationship;
based on the specified relationship, selecting a model that is relevant to any one of the first object and the second object from a plurality of models, the plurality of models include a first model corresponding to the first relationship, a second model corresponding to the second relationship and a third model corresponding to the third relationship, the first model is a model trained with first training data including product advertisement information, the second model is a model trained with second training data including information describing popularity of the product, and the third model is a model trained with third training data including information describing a benefit that is earned by purchasing a product; and
outputting the selected model among the first model, the second model and the third model.

2. The non-transitory computer-readable recording medium according to claim 1, wherein the process further includes:
tracking, based on the result of the analyzing, the first object and the second object;
based on the specified relationship, selecting a machine learning model to be applied to the second object from the first model, the second model and the third model that are machine learning models;
inputting an image of the tracked second object to the selected machine learning model;
specifying relevant information on the second object based on the output from the selected machine learning model; and
causing a display device that is relevant to the tracked second object to output the specified relevant information relevant to the second object.

3. The non-transitory computer-readable recording medium according to claim 1, wherein
the first object is a person,
the second object is a product, and
the process further includes:
referring to a storage in which the specified relationship and a plurality of serving-customer models that define content of serving a customer are associated;

specifying a serving-customer model corresponding to the specified relationship from the first model, the second model and the third model that are serving-customer models;
based on the specified serving-customer model, specifying content of serving a customer that is for the person represented by the first object and that is relevant to the object represented by the second object; and
transmitting the specified content of serving a customer to a terminal device that a sales staff uses.

4. The non-transitory computer-readable recording medium according to claim 1, wherein
the first object is a person,
the second object is a product, and
the process further includes:
referring to a storage in which the specified relationship and a plurality of trained machine learning models that output product information are associated;
specifying a machine learning model corresponding to the specified relationship from the trained machine learning models that include the first model, the second model and the third model;
inputting an image of the product represented by the specified second object to the specified machine learning model;
specifying product information outputted from the specified machine learning model; and
causing a terminal device that the person represented by the first object uses to display the specified product information.

5. The non-transitory computer-readable recording medium according to claim 4, wherein the process further includes:
tracking, based on the result of the analyzing, a position of a person in a store;
based on the tracked position of the person in the store, specifying a terminal device that the person uses; and
causing the specified terminal device to display the specified product information.

6. The non-transitory computer-readable recording medium according to claim 1, wherein the process further includes:
inputting the video to a given model; and
specifying, based on the output from the given model, the first area, the second area, and the relationship and
the given model is a model for HOID (Human Object Interaction Detection) on which machine learning is executed in order to identify first area information that presents a first class presenting a person who purchases a product and an area in which the person appears, second area information that presents a second class presenting an object containing a product and an area in which the object appears, and interaction between the first class and the second class.

7. An information processing method comprising:
acquiring a video;
analyzing the acquired video;
identifying, based on a result of the analyzing, a first area containing a first object included in the acquired video, second area containing a second object included in the acquired video, and a relationship that identifies interaction between the first object and the second object, the relationships being a first relationship, a second relationship or a third relationship;
based on the specified relationship, selecting a model that is relevant to any one of the first object and the second object from a plurality of models by using a processor, the plurality of models include a first model corresponding to the first relationship, a second model corresponding to the second relationship and a third model corresponding to the third relationship, the first model is a model trained with first training data including product advertisement information, the second model is a model trained with second training data including information describing popularity of the product, and the third model is a model trained with third training data including information describing a benefit that is earned by purchasing a product; and outputting the selected model among the first model, the second model and the third model.

8. The information processing method according to claim 7, further including:

tracking, based on the result of the analyzing, the first object and the second object;

based on the specified relationship, selecting a machine learning model to be applied to the second object from the first model, the second model and the third model that are machine learning models;

inputting an image of the tracked second object to the selected machine learning model;

specifying relevant information on the second object based on the output from the selected machine learning model; and causing a display device that is relevant to the tracked second object to output the specified relevant information relevant to the second object.

9. The information processing method according to claim 7, wherein the first object is a person, the second object is a product, and the method further includes:

referring to a storage in which the specified relationship and a plurality of serving-customer models that define content of serving a customer are associated;

specifying a serving-customer model corresponding to the specified relationship from the first model, the second model and the third model that are serving-customer models;

based on the specified serving-customer model, specifying content of serving a customer that is for the person represented by the first object and that is relevant to the object represented by the second object; and transmitting the specified content of serving a customer to a terminal device that a sales staff uses.

10. The information processing method according to claim 7, wherein the first object is a person, the second object is a product, and the method further includes:

referring to a storage in which the specified relationship and a plurality of trained machine learning models that output product information are associated;

specifying a machine learning model corresponding to the specified relationship from the trained machine learning models that include the first model, the second model and the third model;

inputting an image of the product represented by the specified second object to the specified machine learning model;

specifying product information outputted from the specified machine learning model; and causing a terminal device that the person represented by the first object uses to display the specified product information.

11. The information processing method according to claim 10, including:

tracking, based on the result of the analyzing, a position of a person in a store;

based on the tracked position of the person in the store, specifying a terminal device that the person uses; and causing the specified terminal device to display the specified product information.

12. The information processing method according to claim 7, including:

inputting the video to a given model; and specifying, based on the output from the given model, the first area, the second area, and the relationship, and the given model is a model for HOID (Human Object Interaction Detection) on which machine learning is executed in order to identify first area information that presents a first class presenting a person who purchases a product and an area in which the person appears, second area information that presents a second class presenting an object containing a product and an area in which the object appears, and interaction between the first class and the second class.

13. An information processing device comprising:

a memory; and a processor coupled to the memory and configured to:

acquire a video;

analyze the acquired video;

identify, based on analyzing the acquired video, a first area containing a first object included in the acquired video, a second area containing a second object included in the acquired video, and a relationship that identifies interaction between the first object and the second object, the relationships being a first relationship, a second relationship or a third relationship;

based on the specified relationship, select a model that is relevant to any one of the first object and the second object from a plurality of models, the plurality of models include a first model corresponding to the first relationship, a second model corresponding to the second relationship and a third model corresponding to the third relationship, the first model is a model trained with first training data including product advertisement information, the second model is a model trained with second training data including information describing popularity of the product, and the third model is a model trained with third training data including information describing a benefit that is earned by purchasing a product; and output the selected model.

14. The information processing device according to claim 13, wherein the processor is further configured to:

track, based on analyzing the acquired video, the first object and the second object;

based on the specified relationship, select a machine learning model to be applied to the second object from the first model, the second model and the third model that are machine learning models;

input an image of the tracked second object to the selected machine learning model;

specify relevant information on the second object based on the output from the selected machine learning model; and cause a display device that is relevant to the tracked second object to output the specified relevant information relevant to the second object.

15. The information processing device according to claim 13, wherein the first object is a person, the second object is a product, and the processor is further configured to:

refer to a storage in which the specified relationship and a plurality of serving-customer models that define content of serving a customer are associated;

specify a serving-customer model corresponding to the specified relationship from the first model, the second model and the third model that are serving-customer models;

based on the specified serving-customer model, specify content of serving a customer that is for the person represented by the first object and that is relevant to the object represented by the second object; and transmit the specified content of serving a customer to a terminal device that a sales staff uses.

16. The information processing device according to claim 13, wherein the first object is a person, the second object is a product, and the processor is further configured to:

refer to a storage in which the specified relationship and a plurality of trained machine learning models that output product information are associated;

specify a machine learning model corresponding to the specified relationship from the trained machine learning models that include the first model, the second model and the third model;

input an image of the product represented by the specified second object to the specified machine learning model;

specify product information outputted from the specified machine learning model; and cause a terminal device that the person represented by the first object uses to display the specified product information.

17. The information processing device according to claim 16, wherein the processor is further configured to:

track, based on the result of the analyzing, a position of a person in a store;

based on the tracked position of the person in the store, specify a terminal device that the person uses; and cause the specified terminal device to display the specified product information.

18. The information processing device according to claim 13, wherein the processor is further configured to:

input the video to a given model; and specify, based on the output from the given model, the first area, the second area, and the relationship, and the given model is a model for HOID (Human Object Interaction Detection) on which machine learning is executed in order to identify first area information that presents a first class presenting a person who purchases a product and an area in which the person appears, second area information that presents a second class presenting an object containing a product and an area in which the object appears, and interaction between the first class and the second class.

* * * * *